July 7, 1970 A. E. ARCH ET AL 3,519,833

SENSING HEAD FOR REFLECTIVE MARKS ON TAPE

Filed Feb. 12, 1968

INVENTORS.
ANDREW E. ARCH
EUGENE E. PAANANEN
BY
Christie, Parker & Hale
ATTORNEYS.

3,519,833
SENSING HEAD FOR REFLECTIVE MARKS ON TAPE

Andrew E. Arch, Arcadia, and Eugene E. Paananen, Glendora, Calif., assignors to Burroughs Corporation, Detroit, Mich., a corporation of Michigan
Filed Feb. 12, 1968, Ser. No. 704,922
Int. Cl. G06k 7/10
U.S. Cl. 250—219 9 Claims

ABSTRACT OF THE DISCLOSURE

Apparatus for sensing individual reflective marking strips positioned on each half of one side of a moving tape. First and second photo sensing cells are positioned apart so that when tape is passed thereby one photo sensing cell is at one half of such tape and the other photo sensing cell is at the other. A pair of lamps are positioned such that the photo sensing cells are normally not illuminated thereby and such that a reflective marking strip on either half of tape when positioned in front of the corresponding photo sensing cell will reflect light from a lamp back to the corresponding photo sensing cell. An electrical circuit is connected to both of the photo sensing cells and is operative to provide a first output signal when both photo sensing cells are either illuminated or not illuminated and operative to provide a second output signal when only one of the photo sensing cells is illuminated and a third output signal when the other photo sensing cell alone is illuminated.

BACKGROUND OF THE INVENTION

Field of the invention

This invention relates to sensing apparatus and, more particularly, to apparatus for sensing reflective markers on an elongated strip of tape.

Description of the prior art

Magnetic tape transports are commonly known which rapidly move magnetic tape past a transducing head for reading and writing purposes. In such devices it is necessary to know when either the beginning or end of tape is being moved past the transducing head. To this end, reflective strips have been placed on the backside of the tape and sensing heads have been used to sense the reflective strips. Generally, one reflective strip is placed at the end of tape and another reflective tape is positioned at the beginning of tape. The end of tape reflective strip and beginning of tape reflective strip are positioned along opposite edges of the tape.

The combination of a lamp and a photocell is used to detect each reflective strip. The magnetic tape itself is opaque. The light from each lamp shines on the tape when the corresponding reflective strip is encountered and light from the lamp is reflected from the strip back to the corresponding photocell, causing a signal from the photocell. An amplifier is provided for each photocell to amplify the signal from the corresponding photocell caused by the end of tape reflective strip or the beginning of tape reflective strip, as the case may be.

Two different techniques are commonly employed to process the signals from the photocells. One technique employs an alternating current type of amplifier and, the other, a direct coupled type of amplifier for the signals from the photocell. Each technique has its advantages and disadvantages over the other. The alternating current amplifier technique has advantages over the direct coupled amplifier technique as it minimizes errors due to the light drift, photocell drift, dirt accumulation, and variations in tape color. As a result, less maintenance is required for the alternating current amplifier technique than the direct coupled amplifier technique. However, the alternating current amplifier technique suffers from the disadvantage that tape movement is required for detecting the reflective strips. The position of tape cannot be established unless tape is moving when the reflective strip is encountered. The ability to statically sense whether the end of tape or beginning of tape reflective strip is present is very important when starting up the system and beginning to read near one of the reflective strips.

To take care of the possible situation in an alternating current system where tape has been stopped with the reflective strip in front of the photodetection device, the tape is driven in one direction by a fixed amount and then is driven in the opposite direction. In this way, if the reflective strip were present with the tape stopped, the alternating current system is able to sense the reflective strip. However, this technique is undesirable because of the added control required and the waste in time. Another problem arises when the end of record being written is encountered and tape drive is shut off. Sometimes when tape drive is shut off and movement of tape is slowing down a reflective strip is encountered. In an alternating current system, if tape speed is too slow at the time that the reflective strip is encountered, it will not be detected. As a result, undesirable results are obtained.

The direct coupled amplifier technique has the advantage over the alternating current amplifier arrangement in that it is logically simpler and more straightforward because no tape motion is required for the system to operate. However, errors creep into direct coupled systems due to light drift, photocell drift, dirt accumulation, and variations in tape color.

SUMMARY OF THE INVENTION

It has been found that whenever an erroneous reflection appears on tape because of splices, dirt, etc., the unwanted reflection normally appears straight across the tape. Also, reflection is normally evenly distributed across the tape. Accordingly, it was discovered that since a reflective strip is placed on one half of the tape to indicate the beginning of tape and a reflective strip placed on the opposite one half (on the same side) of the tape to indicate the end of tape, the unbalanced condition of the two halves of tape is the most reliable way to mark tape. It was also discovered that the two photodetection cells for the two halves of the tape can be connected differentially to indicate the presence of the beginning and end of tape. In this manner, the problems in the prior art arrangements are greatly reduced or eliminated.

Briefly, an embodiment of the present invention is an apparatus for sensing individual reflective marking strips positioned on each side of one surface of an elongated tape, and includes first and second photo sensing cells positioned apart so that when tape is passed thereby one photo sensing cell is at one side of such tape and the other photo sensing cell is at the other. Illumination means is positioned such that the photo sensing cells are normally not illuminated thereby and such that a reflective marking strip on either side of tape when positioned in front of the corresponding photo sensing cell will reflect light from the illumination means back to the photo sensing cell. Circuit means is electrically connected to both of the photo sensing cells and is operative to provide a first output signal when both photo sensing cells are either illuminated or not illuminated and operative to provide at least one further output signal when only one of the photo sensing cells is illuminated.

An additional feature of an embodiment of the present invention (though not an essential feature) is that by adding another photodetection cell and a reflective surface on the other side of tape, the same illumination means can be used to sense a transparent leader attached to the end of the opaque tape. The transparent leader is used to properly locate the tape/leader junction for unloading purposes.

An embodiment of the present invention has the advantages of both the alternating current and the direct coupled systems. For example, the drift of the photodetection cells caused by aging or heating is normally the same in both cells and the drift cancels out. Also, the sensing head can be adjusted once and will stay adjusted considerably longer than the prior art arrangement. Erroneous reflections from dirt, splices and changes in color of the tape have essentially no effect on the system because the differential sensing arrangement cancels out symmetrical reflections.

Figures 1, 2:
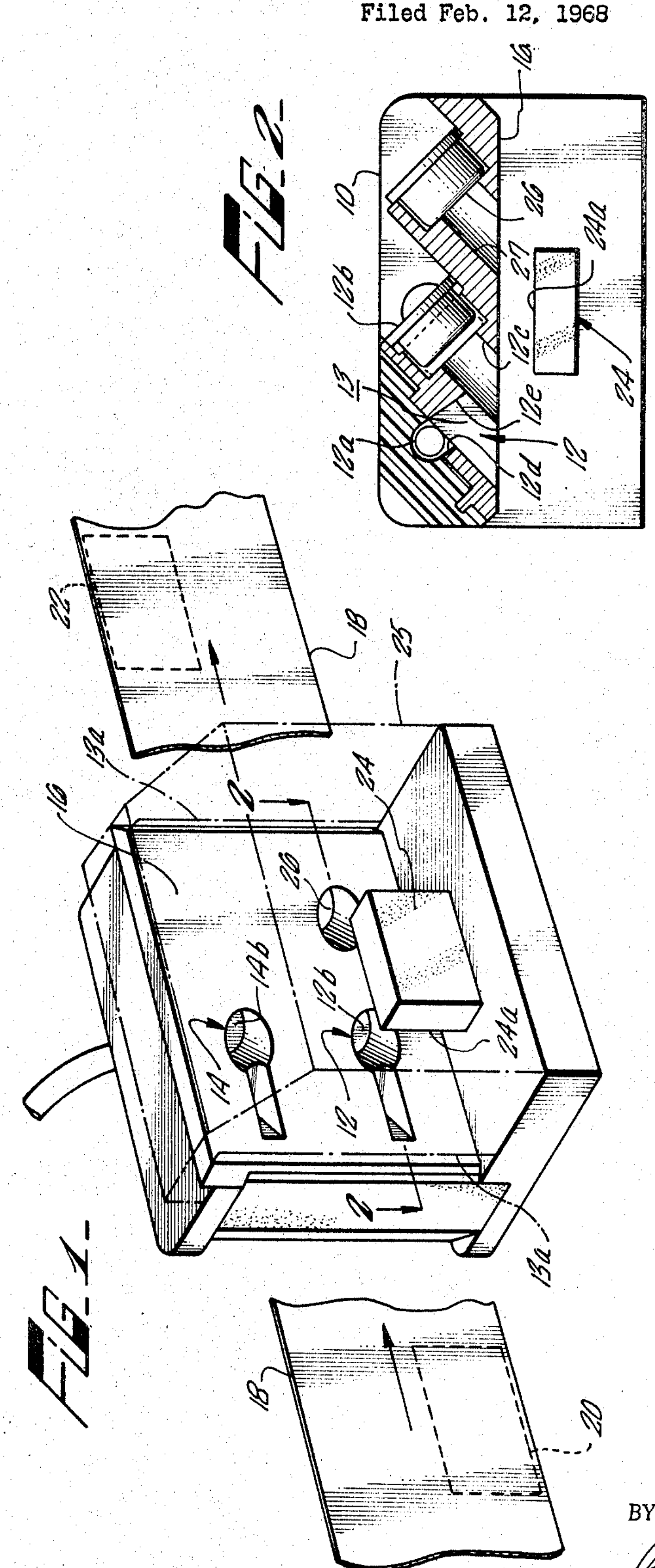
FIG. 1 is a pictorial view of a sensing head apparatus and embodying the present invention.
FIG. 2 is a cross-sectional view of the sensing head apparatus shown in FIG. 1 taken along the lines 2—2.

Refer now to the construction of the sensing head apparatus shown in FIGS. 1 and 2. A plastic housing 10 supports the various lamps and photodetection cells in the apparatus. Detection means 12 and 14 are provided in the housing 10. As best seen in the cross-sectional view of FIG. 2, the detection means 12 includes an incandescent lamp **12*a* and a photodetection cell 12*b*. The lamp 12*a* and the photodetection cell 12*b* are recessed in a cavity 13 in the housing 10. The photodetection cell 12*b* has its photo sensing surface facing a circular opening 12*c* in the recess 13 of the housing 10. An opening 12*d* is provided in the recess 13 of the housing 10 through which light from the lamp 12*a* passes. A shoulder 12*e* of the housing prevents light from the lamp 12*a* from directly striking the photo sensing surface of the photo cell 12*b*.**

The housing 10 has a flat surface 16 in front of which tape is passed. Portions of a piece of tape 18 is shown in FIG. 1 for purposes of illustration. Reflective strips 20 and 22 are positioned on the backside of the tape 18 from the side shown in FIG. 1. Reflective marker strip 20 is positioned on one half of the transverse direction of the tape 18, whereas the reflective marker strip 22 is positioned on the opposite one half. The tape is opaque and normally absorbs light and does not reflect light back to the photodetection cell **12*b*. As the tape 18 is passed along the flat surface 16 of the housing 10 the reflective marker strip 20 passes in front of the detection device 12. The reflective marker strip 20 has a highly reflective surface which faces the detection means 12 and reflects the light from the lamp 12*a* back to the photo sensing surface of the photodetection cell 12*b* causing the photodetection cell 12*b* to produce an electrical signal indicating the presence of the reflective marker strip 20.**

The detection means 14 has a lamp (not shown) and a photodetection cell **14*b* mounted in a recess identical to the detection means 12. However, the detection means 14 is positioned above the detection means 12 (as seen in FIG. 1) so that when the reflective strip 22 passes over the flat surface 16 of the housing 10, it passes in front of the detection means 14. The reflective strip 22 reflects light from the lamp therein back to the photodetection cell 14*b* causing the photodetection cell 14*b* to produce a signal indicative of the presence of the reflective strip 22.**

It should be noted that the reflective marker strips 20 and 22 are positioned at different positions along the length of the tape 18 and do not move in front of the detection means 12 and 14 at the same time. Thus, one of the reflective marker strips can be used to indicate the beginning of tape, whereas the other reflective marker strip can be used to indicate the end of tape. Reflective marker strips can also be used to indicate other positions along the length of the tape.

The housing 10 including the recesses for both detection means is a black color that tends to absorb light. This prevents incidental light from being reflected by the housing back to the photodetection cells. Photo cells **12*b* and 14*b*** are standard cadmium sulfide photodetection cells.

An additional feature of the present invention, but one which is not essential, is that a member 24 is provided which extends up in front of the surface 16 in between the detection means 12 and a photo cell 26. The photo cell 26 is also positioned in a recess in the housing 10 behind the flat surface 16. The photodetection cell 26 is positioned at approximately the same angle as the photodetection cell **12*b* and an opening 27 is provided in the housing between the photo sensitive surface of the photodetection cell 26 and the flat surface 16.**

The member 24 has a reflective surface **24*a* facing the flat surface 16. When the tape does not block the light, light from the lamp 12*a* is reflected by the reflective surface 24*a* of the member 24 back to the photodetection cell 26. Thus, the photodetection cell 26 can be used in conjunction with an existing lamp 12*a*** to indicate when the tape has completely passed beyond the sensing head and a clear transparent leader is being pulled across the sensing head.

A rectangular-shaped cover 25 is preferably placed over the surface 16 and the member 24. The cover 25 is shown in dotted lines so that the essential features of the sensing head can be seen in FIG. 1. The cover 25 provides a slit **13*a*** at both ends through which tape passes into the sensing head. The cover, like the housing, has a black light absorbing surface and minimizes the amount of extraneous light that gets into the detection means.

Figure 3:
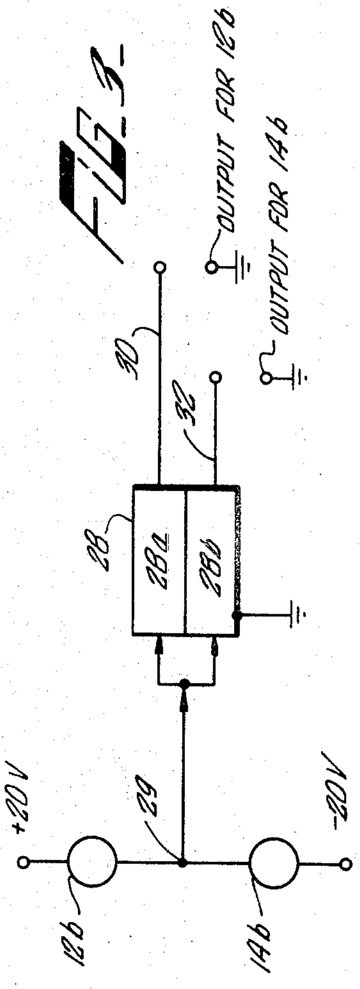
FIG. 3 is an electrical schematic illustrating the connection of the photodetection cells shown in FIG. 1.

The interconnection of the photodetection cells **12*b* and 14*b* and the associated electrical circuits shown in FIG. 3 are of considerable importance and should be noted. The photo cells 12*b* and 14*b* are connected in series between a +20 volt source of potential (not shown) and a −20 volt source of potential (not shown). The junction between the two photo cells, indicated at 29, is connected to the input of an amplifier 28.**

The amplifier 28 has two sections **28*a* and 28*b*, each having a separate output circuit. The amount of light from each of the lamps in the sensing devices 12 and 14 are individually adjusted such that the signal at the junction 29 is normally at 0 volts potential when both lamps are either illuminated or not illuminated. The amplifier section 28*a*** is a conventional amplifier which normally provides a 0 volt output signal when the input signal thereto is at 0 volts potential.

Accordingly, the output signal from the amplifier section **28*a* is normally at 0 volts. The amplifier section 28*a* is also characterized in that when the signal at the junction 29 rises to a positive voltage above a predetermined threshold level, it applies a predetermined positive voltage output signal at the output 30. This positive voltage signal is known as a true signal. The amplifier section 28*b* is similar to the amplifier section 28*a*. However, it senses negative input signals to produce its output signals. Whenever the signal at the junction 29 is at 0 volts potential, the amplifier 28*b* produces a 0 volts output signal at the output circuit 32. When the signal at the junction 29 drops to a negative voltage below a predetermined threshold level, the amplifier 28*b* produces a positive output signal at the output circuit 32.** Again this signal is known as a true signal. Although the threshold levels for the two amplifiers are of opposite polarities their magnitudes are the same.

Consider now the operation of the circuit shown in FIG. 3. Normally, only the opaque tape 18 is in front of the detection means 12 and 14. Accordingly, neither the photo cell 12*b* nor the photo cell 14*b* is illuminated and the signal at the junction 29 is at 0 volts causing a 0 volt signal out from both the amplifier sections 28*a* and 28*b*. Assume now that the reflective marker strip 20 passes in front of the detection means 12 causing the photo cell 12*b* to be illuminated by the corresponding lamp. Illumination of the photo cell 12*b* causes it to decrease its internal impedance, causing the junction 29 to rise above the threshold level for the amplifier 28*a*. This in turn causes the amplifier 28*a* to generate a positive voltage signal of a predetermined level (or a true signal) at the output circuit 30. In this manner, the presence of the marker strip 20 is indicated.

Assume now that instead of the reflective marker strip 20 the reflective marker strip 22 moves into the sensing head and in front of the detection means 14. This causes the photo cell 14*b* to be illuminated by the corresponding lamp, causing the voltage at the junction 29 to drop below the threshold level for the amplifier 28*b*, causing the amplifier 28*b* to generate a positive signal of the predetermined level (or a true signal) at the output circuit 32. Thus, the signal at the output circuit 32 indicates the presence of the reflective marker strip 22.

It should be noted that if dirt or a splice on the tape causes illumination of both the photo cells 12*b* and 14*b*, simultaneously, that the impedance of both will drop by essentially the same amount and the voltage at the junction 29 will remain at 0 volts Hence, the amplifier 28 will not produce a false indication of the presence of reflective marker strips.

It should be noted that the connection of the two photodetection cells 12 and 14 to the amplifier 28 is a differential type of electrical connection in that one or the other, but not both, of the photodetection cells 12*b* and 14*b* must be illuminated to produce a true output signal. It will be evident to those skilled in the art that the same result can be achieved within the scope of the invention by individually connecting the two photodetection cells to the input of a differential amplifier which has the same output signal characteristics as the amplifier 28.

It is desirable that the area on tape receiving light from the lamps in the detection means 12 and 14 be as large an area as possible in order to minimize the effect of undesirable reflections, splices, dirt, etc. It should also be noted that the tape 18 passes just in front of the surface 16 barely clearing the surface, and in this manner minimizes the amount of incidental light striking the photo cells and light leakage between B.O.T. and E.O.T. sensors and light sources.

Although it is not essential to the present invention, it is preferred that both of the photodetection cells 12*b* and 14*b* be mounted in a common body, such as a plastic, so that heat will affect both by the same amount. This will minimize the unbalance created by different temperatures of the two photodetection cells. By placing the two photodetection cells in a common body, the difference in temperature between the two will be minimized.

It should also be noted that a single lamp might be used for both of the photodetection cells, however, it is preferred to use two separate lamps as the amount of light produced by each individual lamp can be adjusted individually and thereby adjust the circuit shown in FIG. 3 so that the junction 29 is in 0 volts potential.

The B.O.T. and E.O.T. lights and cells should be as near as possible in line and perpendicular to the edge of the tape. This will insure maximum protection against unwanted reflections from splices, tape leader junctions, creases, etc., which are generally perpendicular and in line with the edge of the tape.

Although one example of the present invention has been shown by way of illustration, it should be understood that there are many other rearrangements and embodiments of the present invention within the scope of the following claims.

We claim:

1. Apparatus for sensing individual reflective marking strips positioned on each side of one surface of an elongated tape comprising:

first and second photo sensing means positioned apart so that when such tape is passed thereby one photo sensing means is at one side of such tape and the other photo sensing means is at the other;

illumination means positioned such that the photo sensing means are normally not illuminated thereby and such that a reflective marking strip on either side of tape when positioned in front of the corresponding photo sensing means will reflect light from the illumination means back to the photo sensing means; and circuit means electrically coupled to both of said photo sensing means and operative to provide a first output signal when both photo sensing means are substantially equally illuminated and operative to provide at least one further output signal when only one of the photo sensing means is illuminated.

2. Apparatus for sensing individual reflective marking strips positioned on each side of one surface of a movable elongated opaque tape comprising:

first and second photo sensing means positioned apart so that when such tape is passed thereby one photo sensing means is at one side of such tape and the other photo sensing means is at the other;

first and second lamps, respectively, for said first and second photo sensing means so positioned that light from each will be reflected by a reflective marking strip on one side of such tape back to the photo sensing means at the corresponding side of tape, and in the absence of such marking strip the tape prevents light from illuminating the photo sensing means;

means electrically coupling the photo sensing means in series between two points of reference potential; and amplifier means having an input circuit coupled in between the two photo sensing means and having two output circuits, one corresponding to each of said photo sensing means, the amplifier means being operative for applying a unique output signal to only one of the output circuits in response to a signal caused by illumination of only the corresponding photo sensing means and operative for forming a second output signal at both output circuits in response to signals caused by substantially the same amount of illumination of both photo cells.

3. Apparatus as defined in claim 2 wherein said photo sensing cells have a common connection between the two, the photo sensing cells normally providing a predetermined signal at the common connection when neither photo cell is illuminated or both photo cells are illuminated and the photo cells providing a minimum signal change of one of two polarities with reference to the predetermined signal when the photo cells are individually illuminated, said amplifier means having the input circuit thereof connected to said common connection.

4. Apparatus as defined in claim 2 including a reflective surface positioned so that it is located on the opposite side of the tape from the reflective strips on tape, and still another photo sensing cell so positioned in the apparatus that light from one of the lamps is reflected thereto by the reflective surface when the opaque tape passes out from in between the reflective surface and said still another photo sensing means.

5. Apparatus for sensing individual reflective marking strips positioned along each side of one surface of an elongated tape, comprising:

a housing;

a pair of detection means each comprising a lamp and a photo sensing means, each detection means being disposed in the housing and spaced apart from each other such that when the tape is passed thereby one reflective strip will pass in front of one detection means and the other reflective strip will pass in front of the other detection means thereby causing light from the corresponding lamp to be reflected such that the corresponding photo sensing means is illuminated; and circuit means electrically connected to both of said photo sensing means and operative to provide a first output signal when both photo sensing means are either illuminated or not illuminated and operative to provide a second output signal when only one of the photo sensing means is illuminated and a third output signal when the other photo sensing means alone is illuminated.

6. Apparatus as defined in claim 5 wherein said photo sensing means are mounted in a common member so that the temperature of the two photo sensing means remains substantially the same.

7. Apparatus for sensing individual reflective marking strips positioned along each side of one surface of an elongated tape comprising:

a housing;

a pair of detection means each comprising a lamp and a photo sensing means, each detection means being disposed in the housing and spaced apart from each other such that when the tape is passed thereby one reflective strip will pass in front of one detection means and the other reflective strip will pass in front of the other detection means thereby causing light from the corresponding lamp to be reflected such that the corresponding photo sensing means is illuminated, said photo sensing means being mounted in a common member so that the temperature of the two photo sensing means remains substantially the same, said photo cells being connected together in series; and circuit means including an amplifier connected to the common connection between the two photo sensing means and operative to provide a first output signal when both photo sensing means are either illuminated or not illuminated and operative to provide a second output signal when only one of the photo sensing means is illuminated and a third output signal when the other photo sensing means alone is illuminated.

8. Apparatus according to claim 1 wherein said circuit means is connected in a differential circuit relation with said first and second photo sensing means.

9. Apparatus according to claim 1 wherein said first and second photo sensing means are coupled together in series and the input to said circuit means is coupled to the series coupling between said first and second photo sensing means.

No references cited.

RALPH G. NILSON, Primary Examiner

M. ABRAMSON, Assistant Examiner

U.S. Cl. X.R.

250—220